United States Patent Office.

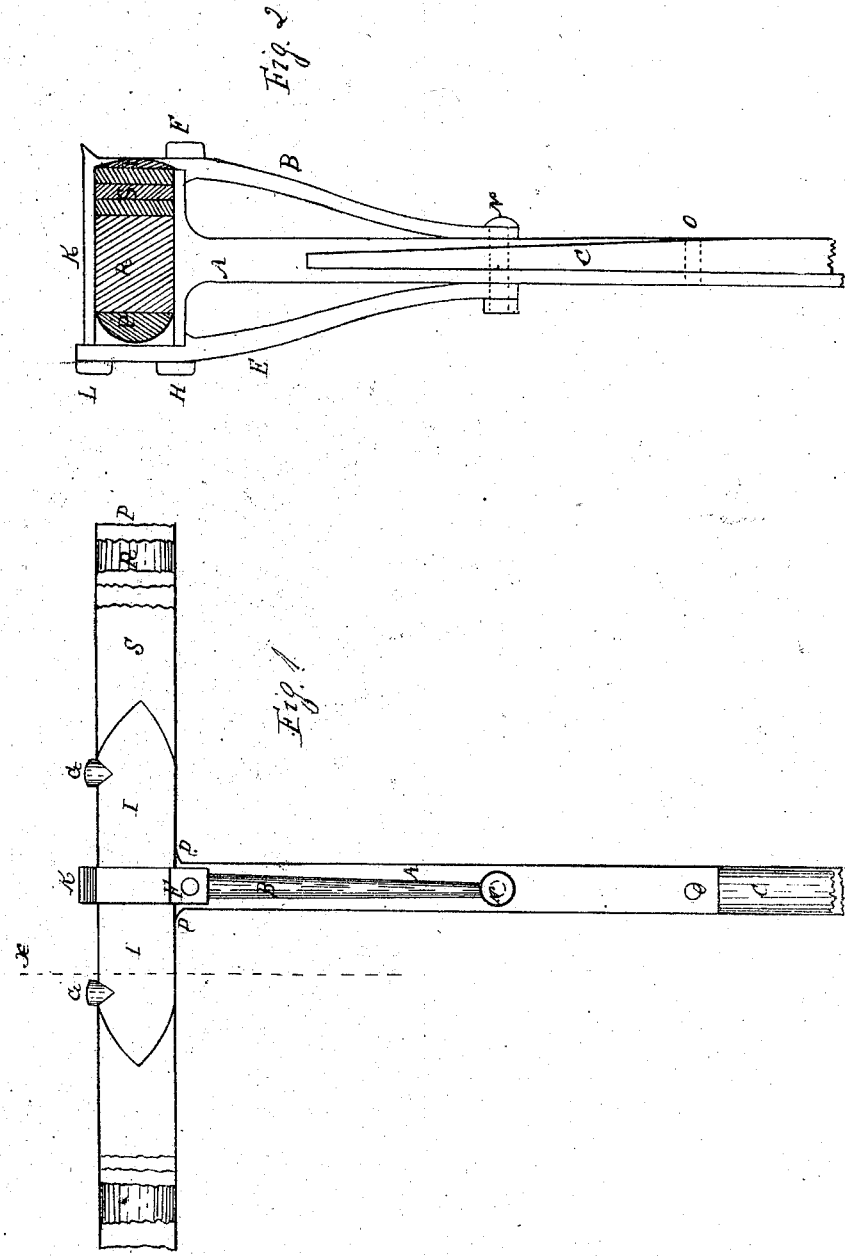

DARIOUS A. MATHEWS, OF GENEVA, NEW YORK, ASSIGNOR TO D. W. BAIRD.

Letters Patent No. 75,688, dated March 17, 1868.

IMPROVED CARRIAGE-PERCH CONNECTION.

*The Schedule referred to in these Letters Patent and making part of the same.*

TO ALL WHOM IT MAY CONCERN:

Be it known that I, DARIOUS A. MATHEWS, of Geneva, Ontario county, State of New York, have invented an Improved Carriage-Perch Connection; and I do hereby declare the following description and accompanying drawings are sufficient to enable any person skilled in the art or science to which it most nearly appertains to make and use my said invention or improvements without further invention or experiment.

The nature of my invention and improvement consists in providing a device for connecting the perch to the axle and rocker or head-block of a carriage, such that, by means of a T-piece, having a fork or socket to receive the end of the perch, a single brace, and a brace combined with two flat horizontal arms, and a vertical arm or clip-bar, and provided with nuts and screws, the perch may be firmly secured to the axle or rocker, and the axle, stock, or bed-piece and spring, and the rocker or head-block and front spring firmly secured together, without weakening either by mortising or boring. In describing my invention I refer to the accompanying drawings, forming part of this specification—

Figure 1 being a plan or top view of my improved connection, with a portion of the perch, to which it is attached, and the middle part of the axle, stock, and spring embraced by it; and Figure 2, a side elevation of the same parts cut through the red line $x$ $x$.

The strong metallic T-shaped piece, A, has a screw and nut on the end of each of its arms at F and H, and a fork or socket in the main stem to receive the end of the wooden perch C. The top brace, B, extends across the spring, and has the flat horizontal arms, I I, resting on the spring S, and provided with the ears or projections G G, extending over the edge of the spring and downward, so as to hold the same in place. This brace, B, has also a vertical arm or clip-bar, K, extending down on the rear side of the spring, stock, and axle, opposite the head of the T, and passing through the bottom brace E, is secured thereto by a nut and screw at L. The brace E is also secured to the lower arm of the T, which passes through it, by the nut and screw at H. Both the braces, B and E, are fastened to the socket, and the perch C secured in the same by the screw-bolt N passing through them all; and a rivet passes through the arms of the socket and the perch at O. The stem of the T-piece A joins the arms by curves, as shown in fig. 2, and short arms of the same solid metal project on either side, as seen at D D, fig. 1, for the same purpose, that is, to insure greater firmness and strength.

The same device may be used for connecting the fore end of the perch to the head-block and securing the spring to the same; but then we may omit that part of the brace, E, from the slot H to the perch, or we may omit the whole brace, and the lower arm of the T may be made to extend across beneath the spring, and the bar K pass through it.

By the single device here described, the axle P, the stock R, and the spring S are firmly held and secured together, and the end of the perch well secured to the same without weakening the stock by a mortise for the perch, or by bolt-holes through it or through the axle or spring.

What I claim as my invention and improvement in reach or perch-connections to axles and rockers of carriages, is—

The T-piece A, provided with screws and nuts, as described, and a fork or socket for the wooden perch C; and, in combination with the T-piece above claimed, I claim the brace B, provided with an arm, K, and screw and nut, substantially as described and for the purposes set forth.

I also claim combining with the brace B the arms I I and ears or lugs G G, substantially as shown and described and for the purposes set forth; and, in combination with the T-piece A and brace B, I claim the brace E, perforated for the bolt and screws, as described.

DARIOUS A. MATHEWS.

Witnesses:
F. D. PAGE,
IRA PARKER.